United States Patent [19]
Vogeli

[11] 3,811,279
[45] May 21, 1974

[54] SHUT-OFF VALVE FOR A WORKING MEDIUM CIRCUIT

[75] Inventor: Ernst Vogeli, Wiesendangen/Zurich, Switzerland

[73] Assignee: Sulzer Brothers Ltd., Winterthur, Switzerland

[22] Filed: May 21, 1971

[21] Appl. No.: 145,705

[30] Foreign Application Priority Data
May 26, 1970  Switzerland.......................... 7809/70

[52] U.S. Cl.................... 60/660, 60/108, 251/63.5
[51] Int. Cl............................................. F01k 7/20
[58] Field of Search ............... 60/105, 108; 251/63.5

[56] References Cited
UNITED STATES PATENTS

| | | | |
|---|---|---|---|
| 833,891 | 10/1906 | Paul | 251/63.5 X |
| 981,313 | 1/1911 | Robinson | 251/63.5 X |
| 1,121,019 | 12/1912 | Kieser | 60/108 |
| 1,600,337 | 9/1926 | Johnson | 60/108 |
| 2,552,239 | 5/1951 | Warren | 60/108 |
| 3,410,304 | 11/1968 | Paul, Jr. | 251/63.5 X |
| 2,825,306 | 3/1958 | Buri | 60/105 X |

FOREIGN PATENTS OR APPLICATIONS
1,035,110  4/1951  France ............................. 251/63.5

Primary Examiner—Martin P. Schwadron
Assistant Examiner—Allen M. Ostrager
Attorney, Agent, or Firm—Kenyon and Kenyon Reilly Carr and Chapin

[57] ABSTRACT

The shut-off valve is operated via a servo-motor under the influence of the working medium in the circuit. One side of the servo-piston is connected to a first pressure point in the circuit while the opposite side is connected to a second pressure point in the circuit of different pressure. Control valves are also provided to reverse the connections of the pressure points to the servo-motor and to supply the working medium to the servo-motor. Depending on the valve condition required, the control valves are manipulated to permit opening or closing of the valve.

9 Claims, 5 Drawing Figures

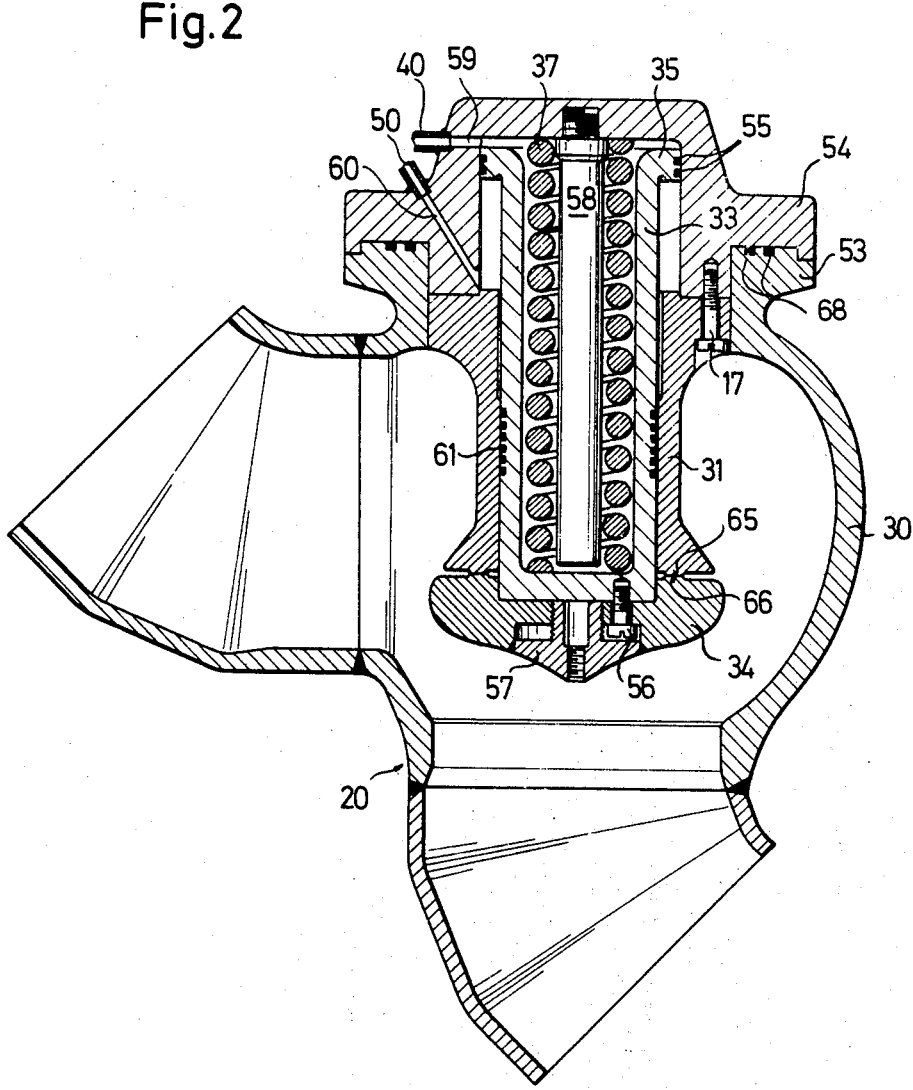

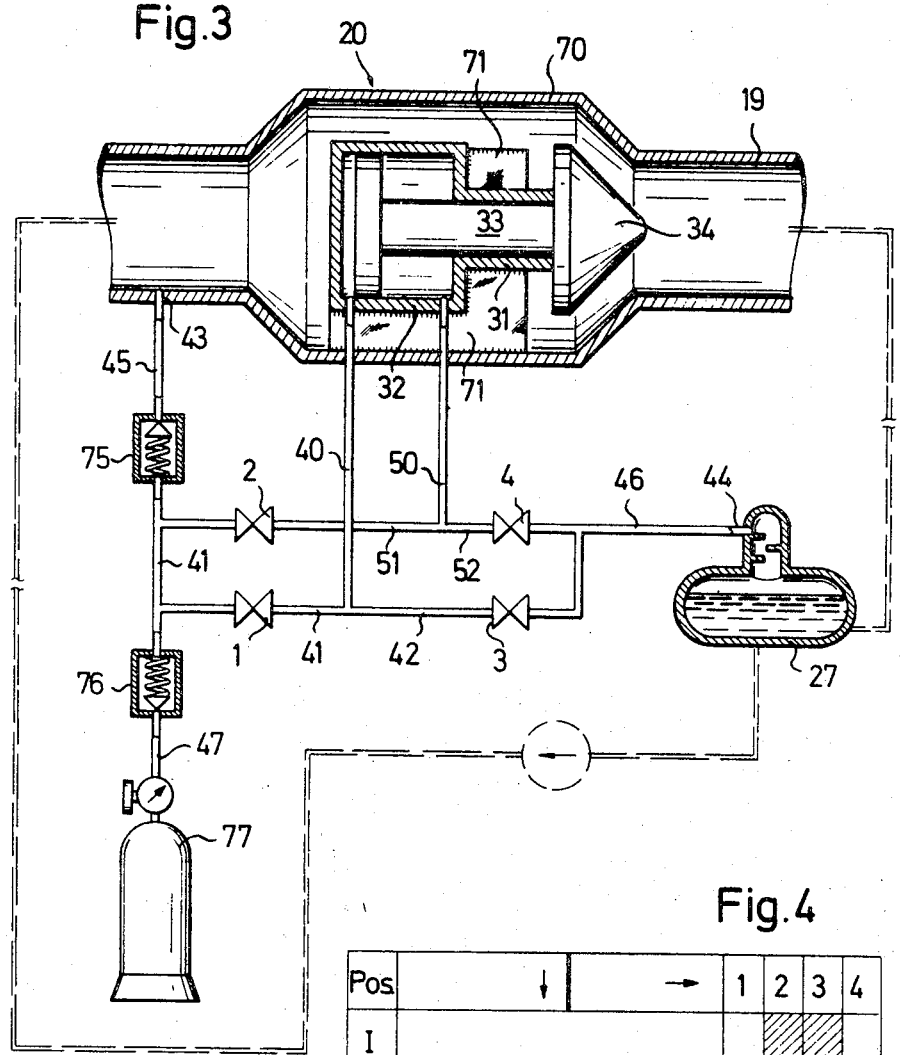

SHUT-OFF VALVE FOR A WORKING MEDIUM CIRCUIT

This invention relates to a valve. More particularly, this invention relates to a valve for shutting off a flow of working medium in a circuit containing a feed pump and a working medium expansion means.

Heretofore, valves have been known to be constructed in various manners to satisfy various conditions in a particular environment. Generally, these valves have a valve closure member and a body and, in many instances, a gland-type seal has been required between the valve closure member and the valve body. However, the use of a gland-type seal has raised the possibility of leakage such that many of these types of valves have not been useful in environments where leakage cannot be tolerated, such as in a nuclear power plant. In some other instances, the valves have been constructed in a relatively massive form such as to be relatively cumbersome to install and maintain or to be relatively costly in manufacture.

Accordingly, it is an object of the invention to provide a valve which is relatively leak-proof.

It is another object of the invention to provide a valve which is of compact construction.

It is another object of the invention to provide a shut-off valve which is free of gland-type seals.

Briefly, the invention provides a shut-off valve for a working medium circuit wherein the valve is actuated by the working medium. The circuit contains a feed pump and a working medium expansion means and the shut-off valve is arranged to be operated by a servo-motor comprising a piston and cylinder assembly. In order to cause the servo-motor to operate the valve, the cylinder chambers on either side of the piston are each connected via control valve means to a first point in the working medium circuit and to a second point in the working medium circuit. The first point is located between the feed pump and the shut-off valve in the direction of flow of working medium and the second point is located between the expansion means and the feed pump in the direction of flow of working medium.

Since the chambers on either side of the servo-piston of the shut-off valve can be connected to two points in the working-medium circuit at which the working medium is at different pressures, the working medium can easily be used to control the servo-piston and therefore to operate the shut-off valve without any gland-type seals being required between the valve closure member and the body of the shut-off valve. Since this prevents a leakage, such a valve is suitable for use inside the containment of a nuclear power plant. Moreover, it is possible to construct the shut-off valve in compact form and this is of advantage in a nuclear power plant in which shut-off valves with large seat diameters, for example 500 millimeters (mm), are required.

In one embodiment, the shut-off valve is constructed in a compact form with a valve closure member, valve guide, stem and servo-piston which forms a unit with a cover so as to be mounted as such in the valve body. The unit can also be tested as a whole before and after placement in the valve body.

In another embodiment, the shut-off valve is constructed with the valve body formed in the line conducting the working medium therethrough.

In still another embodiment, wherein the working medium circuit is used to conduct a vapor, such as steam, a liquid reservoir is connected to the servo-piston of the shut-off valve so as to supply a non-compressible operating medium thereto in order to prevent oscillation of the servo-piston which might otherwise occur if the vapor were supplied thereto.

During operation, when the shut-off valve is closed, the pressure in the two chambers and at the first point (the point situated between the feed pump and the shut-off valve in the direction of flow of working-medium) are equalised and kept equalised by way of the control valve means.

These and other objects and advantages of the invention will become more apparent from the following detailed description and appended claims taken in conjunction with the accompanying drawings in which:

FIG. 2 illustrates a cross-sectional view through a shut-off valve according to the invention;

FIG. 3 illustrates a circuit having another form of shut-off valve according to the invention;

FIG. 4 illustrates a table showing the manner in which the valve shown in FIG. 3 is operated.

Figure 1:
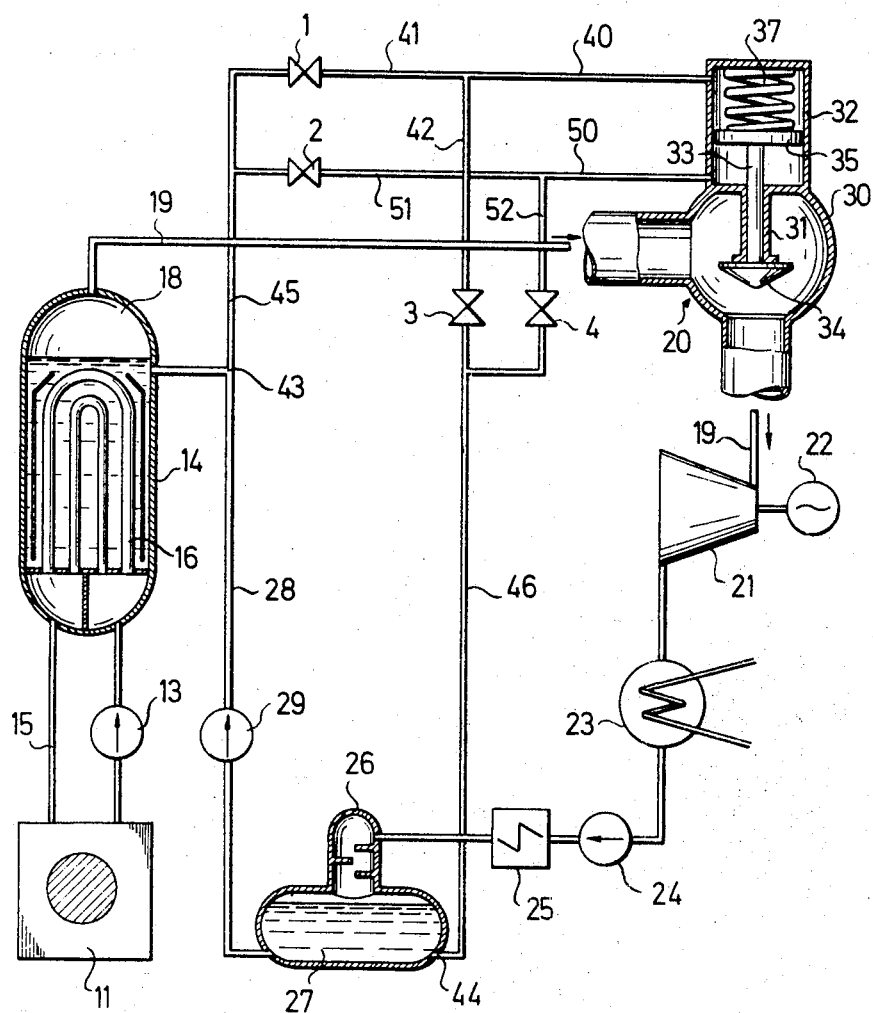
FIG. 1 illustrates a circuit diagram of a steam power plant incorporating a shut-off valve according to the invention.

Referring to FIG. 1, a shut-off valve 20 is situated in the secondary circuit of an evaporator 14, in which the nuclear energy from a nuclear reactor 11 is utilized to produce steam. The reactor 11 is situated in the primary circuit of the evaporator 14 and is cooled with, for example, water which is fed to the evaporator 14 by a circulating pump 13, transfers heat to the working medium, for example, water, in the secondary circuit, while passing through U-shaped tubes 16 in the evaporator 14, and flows back to the reactor 11 along a line 15.

The water for the secondary circuit is drawn from a feed water tank 27 by a feed pump 29 and fed to the evaporator 14 along a line 28. A line 19 in which the shut-off valve 20 is located leads from a steam collecting space 18 at the top of the evaporator 14 to a steam turbine 21, in which expansion of the secondary working medium evaporated in the evaporator 14 takes place. The steam turbine 21 is coupled to an electricity generator 22 as is known. The expanded working medium leaving the turbine 21 is directed to and condensed in a condenser 23. The condensate returns through a condensate pump 24, a steam-heated preheater 25 and a deareator 26 to the feed water tank 27.

The shut-off valve 20 consists of a spherical body 30 provided with a guide 31 and with a servo-cylinder 32. In addition, the valve 20 has a valve closure member 34 secured to a stem 33 which is slidably mounted in the guide 31. In order to move the closure member 34 between an open position and a closed position, a servo-piston 35 is provided at the upper end of the stem 33. A spring 37, disposed between the upper end wall of the servo-cylinder 32 and the top of the servo-piston 35, assists the closing movement of the closure member 34. For example, when the differential pressure across the servo-piston 35 is zero, the spring 37 biases the closure member 34 into the closed position against the valve body 30. A line 40 is connected to the upper chamber of the servo-cylinder 32 and divides into two lines 41, 42 at a point spaced from the valve 20. One line 41 leads through a valve 1, acting as a control element, into a line 45 extending to a first point 43 in the line 28 situated between the feed pump 29 and the shut-off valve 20. The other line 42 contains a valve 3, operating as a control element, and is connected to a line 46 leading to a second point 44 situated between the turbine 21, which forms the expanding means in the circuit, and the feed pump 29. A line 50 is also connected to the lower chamber of the servo-cylinder 32 and divides into two lines 51, 52. One line 51 leads through a valve 2, acting as a control element, into the line 45 and the other line 52 leads through a valve 4, also acting as a control element, to the line 46. By means of the lines 40, 41, 42 and 45 with the control elements 1 and 3 and the lines 50, 51, 52 and 46 with the control elements 2 and 4, each of the chambers on either side of the servo-piston 35 can be connected either to the point 43 or the point 44. The control elements 1, 2, 3, 4 are glandless stop valves.

When the plant is relieved of pressure, the shut-off valve 20 is closed due to the action of the spring 37. If steam pressure builds up in the steam collecting space 18 in the evaporator 14, the shut-off valve 20 can be opened by opening the valves 2, 3 and closing the valves 1, 4. In this case, liquid working medium under pressure flows along the line 28 and the lines 45, 51 and 50 into the space below the servo-piston 35, while the chamber above the servo-piston 35 is connected by the lines 40, 42 and 46 to the point 44 where the pressure is lower than at the point 43. The working medium at a higher pressure in the lower chamber compresses the spring 37 and the shut-off valve 20 opens.

If the line 19 leading from the shut-off valve 20 to the turbine 21 fractures, the shut-off valve 20 must be closed rapidly. This is done by opening the valves 1, 4 and closing the valves 2, 3. In this case, the chamber above the servo-piston 35 is connected by the lines 45, 41 and 40 to the point 43 in the secondary circuit where the working-medium pressure is higher, and the chamber below the servo-piston is connected to the point 44 via lines 50, 52 and 46. The shut-off valve 20 then closes immediately, assisted by the spring 37.

The place at which the line 50 leads into the servo-cylinder 32 is preferably slightly above the bottom end of the cylinder 32 so that the servo-piston 35 closes the exit from the line 50 during the latter part of the closing stroke of the valve closure member 34. The medium thus trapped in the lower chamber is able to cushion the impact of the valve closure member 34 on its seat in the valve body 30.

Referring to FIG. 2, wherein like reference characters indicate like parts as above, the shut-off valve 20 is notable for its compact and space-saving construction. The spherical body 30 has a flange 53 and is closed by a cover 54, which also forms the servo-cylinder 32. The guide 31 for the stem 33 of the valve closure member 34 is in the form of a sleeve with a thick upper edge which is fixed by screws 17 to an annular shoulder portion of the cover 54. The valve closure member 34 is fixed to the bottom end of the stem 33 by screws 56 which are masked and secured by a streamlined cap 57 threaded into the closure member 34. The upper end of the stem 33 bears a flange which slides in a corresponding recess in the cover 54 and forms the servo-piston 35. Both this piston 35 and the lower portion of the stem 33 are provided with piston rings 55, 61 respectively. The stem 33 contains a blind bore running from the flange 35 to house the spring 37 which is centered internally by means of a rod 58 fixed to the cover 54. The rod 58 may contain a sensor for the valve stroke. Two bores 59, 60 in the cover 54 lead into the spaces above and below the servo-piston 35 and are connected to the lines 40, 50 respectively. The lower end face of the guide 31 and the opposite surface on the valve closure member 34 are provided with projecting sealing surfaces 65, 66, respectively, which form a secondary seal. In addition to being compact, the shut-off valve 20 has the considerable advantage of not requiring any gland seal. The only seal operating to the exterior consists of rings 68, which are of silver and are situated between the flanges on the spherical body 30 and cover 54. The space between the two rings 68 may be connected to the condenser 23 shown in FIG. 1, by way of a detector and line sealed off from the atmosphere.

The form of shut-off valve 20 as shown in FIG. 2 has the particular advantage that the valve closure member 34, valve guide 31, stem 33 and servo-piston 35 form with the cover 54, a unit which can be mounted complete on the valve body 30 and which can be tested as a whole before attachment to and after removal from the valve body 30.

Referring to FIG. 3, wherein like reference characters indicate like parts as above, the valve body of the shut-off valve 20 can also be formed by an enlargement 70 in the line 19. In this case, the servo-cylinder 32 and the guide 31 for the valve stem 33 are welded into the enlargement 70 on three radial webs 71, only two of which are visible. Out of the servo-cylinder 32 lead the lines 40 and 50, connected by the lines 41, 51 and 45 with the valves 1 and 2 to the first point 43 and by the lines 42, 56 and 46 with the valves 3 and 4 to the second point 44 in the working-medium circuit. In addition, the line 45 contains a non-return valve 75, as shown. A pressure gas reservoir 77 is also provided, and is connected to the line 41 by a line 47 containing a non-return valve 76. Since the downstream sides of the two non-return valves 75, 76 are connected to one another and to the valves 1 and 2, it is possible, by suitably operating the valves 1 and 2, to supply working medium from the point 43 or high-pressure gas from the reservoir 77 to the servo-cylinder 32. High-pressure gas is supplied when the pressure difference between the working medium and the high pressure gas drops below a given level. This circuit arrangement ensures that the shut-off valve 20 can be kept closed even if no working-medium pressure is present. In this case, there is no need for a spring corresponding to the spring 37 shown in FIGS. 1 and 2.

In order to keep down internal leakage losses, the valves 1 to 4 of the circuit shown in FIG. 3 may be operated in the manner indicated in the table in FIG. 4. That is, in order to close the shut-off valve 20, the valves 1 and 4 are opened and the valves 2 and 3 closed (position I). The shut-off valve 20 is then kept closed by connecting the chamber in the servo-cylinder 32 to which the line 50 is connected to the first point 43, by opening the valve 2 and closing the valve 4 (position II). As a result, the pressure gradient along the guide 31 is very small.

In order to open the shut-off valve 20, the valves 2, 3 are opened and the valves 1, 4 closed (position III). The valve 20 is then kept open by reversing the valves 2 and 4, that is, closing the valve 2 and opening the valve 4 (position IV), so that the two chambers in the servo-cylinder 32 are connected to the second point 44 in the working-medium circuit. If there is a secondary seal between the valve closure member 34 and the end of the guide 31 as in the valve shown in FIG. 2, internal leakage is also prevented in position IV.

Operation of the valves 1 to 4 as described with reference to the table in FIG. 4 may be carried out by means of a logical control system, preferably an electronic logical control system.

Figure 5:
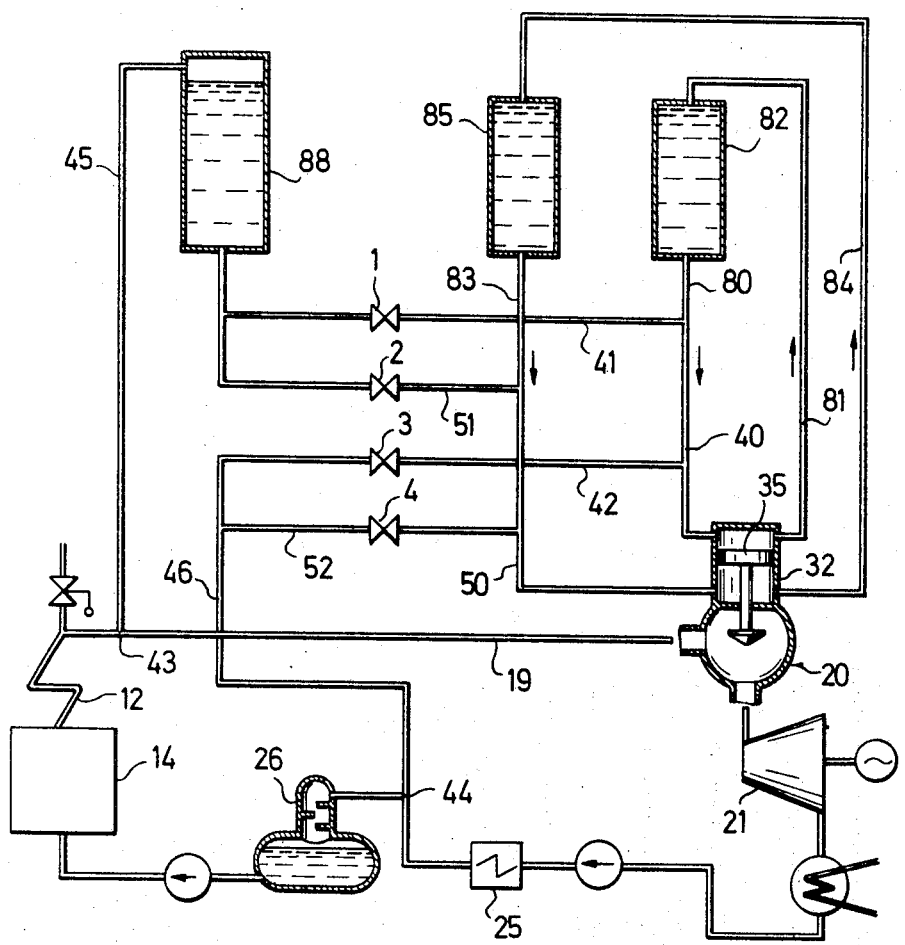
FIG. 5 illustrates a circuit diagram for another steam power plant incorporating a shut-off valve according to the invention.

Referring to FIG. 5, wherein like reference characters indicate like parts as above, in order to prevent oscillation of the servo-piston 35 under the influence of a compressible working medium within the servo-cylinder 32, provision can be made to transform the working medium into a substantially non-compressible liquid state before being transmitted to the servo-cylinder 32. For example, in the case where the operating medium is steam, a liquid reservoir is provided in line 45 upstream of the control valves 1, 2 in the form of a tank 88 largely filled with liquid. The line 45 enters the tank 88 above the liquid level while the lines 41, 51, which communicate by way of lines 40, 50, respectively, with the spaces above and below the servo-piston 35 are connected to the liquid space of the tank 88. The tank 88 thus serves as a means to permit the steam passing into the tank 88 from the line 45 to condense into water before being used to move the servo-piston 35. By bringing the liquid reservoir into the circuit, the point 43 can be brought into a portion of the working-medium circuit which carries steam without any working medium in the form of steam entering the two chambers of the servo-cylinder 32. This is particularly advantageous where a supply of liquid operating medium from the working-medium circuit to the servo-cylinder 32 is impossible or too costly. Since some steam will always be condensing in the tank 88, there will always be sufficient water available to fill the appropriate chamber in the servo-cylinder 32 when the servo-piston 35 is displaced.

In addition to the above, in order to ensure against any steam formation within the chambers on either side of the servo-piston 35, a natural-circulation cooling system is connected to the servo-cylinder 32. This cooling system is formed of two condensers 82, 85 which are situated above the servo-piston 35, the bottom end of one condenser 82 being connected by a line 80 to the line 40 which leads to the upper chamber of the servo-cylinder 32 and the other condenser 85 being connected in a similar manner by a line 83 to the line 50 leading to the lower chamber. A further line 81 leads from the upper chamber of the servo-cylinder 32 to the upper end of the condenser 82 and a corresponding line 84 leads from the lower chamber of the servo-cylinder 32 to the upper end of the condenser 85. Due to the heat absorbed in the shutoff valve 20 and the cooling in the condensers 82 and 85, natural circulation of the working medium supplied to both ends of the piston 35 takes place in the cooling system as indicated by the arrows, so that no steam can form in the two chambers. The provision of the two condensers 82, 85 is particularly convenient, if the evaporator 14 is followed by a super-heater 12 so that the turbine 21 is supplied with superheated steam.

In another arrangement (not shown), the valves 1 to 4 may be replaced by two three-way valves. If one of these two valves is substituted for valves 1 and 3 and the other for valves 2 and 4, this arrangement has the particular advantage that the four possible positions of the two three-way valves correspond to the positions I to IV indicated in FIG. 4.

What is claimed is:

1. In combination with a working medium circuit including a feed pump and a working medium expansion means; a shut-off valve located between said feed pump and said expansion means for controlling a flow of working medium to said expansion means; a servo-motor connected to said shut-off valve to open and close said shut-off valve, said servo-motor having a piston and cylinder assembly, a chamber of each opposite side of said piston connected to a first point and to a second point in said working medium circuit, said first point being between said feed pump and said shut-off valve in the direction of flow of working medium and said second point being between said expansion means and said feed pump in the direction of flow of working medium; and control valve means between each chamber and said first and second points to control a flow of working medium therebetween.

2. The combination as set forth in claim 1 which further includes a line connecting said feed pump to said expansion means, and wherein said shut-off valve includes a body connected into said line and said servo-motor is connected to said body outside said line.

3. The combination as set forth in claim 1 which further includes a line connecting said feed pump to said expansion means, and wherein said shut-off valve and said servo-motor are located in said line.

4. The combination as set forth in claim 1 wherein at least one of said points is situated in a portion of said circuit in which the working medium is liquid during normal operation.

5. The combination as set forth in claim 1 which further includes a liquid reservoir interconnected between one of said points and said chambers of said servo-motor, said one of said points being connected to a portion of said circuit in which the working medium is in vapor form.

6. The combination as set forth in claim 1 wherein said control valve means communicates each chamber with said first point when said shut-off valve is closed to equalize and to maintain equalized the pressure in each chamber.

7. The combination as set forth in claim 1 wherein said valve includes a spherical valve body, a guide within said valve body and a valve closure member for selective seating against said guide and said valve body; said servo-motor includes a cover mounted on said body and secured to said guide to define a servo-cylinder, and said piston is slidably mounted in said guide and said cover to divide said servo-cylinder into said chambers and is connected to said valve closure member; said valve closure member, guide, cover and piston forming a unit removably secured to said valve body.

8. The combination as set forth in claim 1 wherein said control valve means communicates each chamber with said second point when said shut-off valve is closed to equalize and maintain equalized the pressure in each chamber and said second point.

9. The combination as set forth in claim 1 wherein a natural circulation cooling system is connected to each chamber of said servo-motor to ensure against vapor formation in each chamber, said system including a condenser connected to each chamber.

* * * * *